United States Patent
de Mollerat du Jeu et al.

(10) Patent No.: US 9,272,472 B2
(45) Date of Patent: Mar. 1, 2016

(54) METHOD OF SHAPING AN OPTICAL ELEMENT THAT IS ELASTICALLY DEFORMED BY AN ADHESIVELY-BONDED RING

(71) Applicant: Thales Seso, Aix en Provence (FR)

(72) Inventors: Christian de Mollerat du Jeu, Les Milles (FR); Marc Ferrari, Marseilles (FR); Gerard Lemaitre, Aix en Provence (FR); Emmanuel Hugot, Simiane Collongue (FR)

(73) Assignee: THALES SESO, Aix en Provence (FR)

( * ) Notice: Subject to any disclaimer, the term of this patent is extended or adjusted under 35 U.S.C. 154(b) by 88 days.

(21) Appl. No.: 13/892,739

(22) Filed: May 13, 2013

(65) Prior Publication Data
US 2013/0306224 A1    Nov. 21, 2013

(30) Foreign Application Priority Data

May 15, 2012   (FR) ...................................... 12 54461

(51) Int. Cl.
| | |
|---|---|
| *B29C 65/48* | (2006.01) |
| *B29D 11/00* | (2006.01) |
| *B24B 13/00* | (2006.01) |
| *B24B 13/005* | (2006.01) |
| *B24B 1/00* | (2006.01) |

(52) U.S. Cl.
CPC ............ *B29D 11/00019* (2013.01); *B24B 1/00* (2013.01); *B24B 13/005* (2013.01); *B24B 13/0043* (2013.01)

(58) Field of Classification Search
CPC ............ B24B 13/0055; B24B 13/0057; B24B 13/0052; B24B 13/0043; B29D 11/00019
USPC .............. 156/160, 391; 264/2.7, 162; 65/272, 65/59.24, 59.34
See application file for complete search history.

(56) References Cited

U.S. PATENT DOCUMENTS

| | | | |
|---|---|---|---|
| 2007/0229756 A1* | 10/2007 | Mandler et al. ................ | 351/159 |
| 2009/0315202 A1* | 12/2009 | de Mollerat du Jeu et al. ............................. | 264/2.7 |

FOREIGN PATENT DOCUMENTS

EP    2 144 093 A1    1/2010

OTHER PUBLICATIONS

French Preliminary Search Report for Application No. FR 1254461 dated Jan. 16, 2013. Nelson, J. E. et al., *Stressed Mirror Polishing. 2: Fabrication of an Off-Axis Section of a Paraboloid*, Applied Optics, vol. 19, No. 14 (Jul. 1980) 2341-2352.
(Continued)

*Primary Examiner* — Jacob T Minskey
*Assistant Examiner* — Vishal I Patel
(74) *Attorney, Agent, or Firm* — Alston & Bird LLP

(57) ABSTRACT

A method of shaping an aspherical optical element is provided that includes the steps of fastening an optical element blank to a ring, the blank presenting an optical surface that is to be shaped and a surface referred to as a rear surface; applying forces and moments to the ring in order to deform the optical element and its optical surface, which element is fastened to the ring; using abrasion to shape said deformed optical surface so as to restore a spherical or planar shape thereto; and extracting the blank from the ring so as to release the stresses deforming said shaped optical surface so as to allow it to acquire the desired aspherical shape. The method also includes the step of fastening the blank to the ring is performed by bonding the optical surface or the rear surface to a surface of the ring with a layer of adhesive.

9 Claims, 6 Drawing Sheets

(56) References Cited

OTHER PUBLICATIONS

Sporer, S. F., *TMT—Stressed Mirror Polishing Fixture Study*, Proc. of SPIE, vol. 6267 (Jun. 2006) 13 pages.

Lubliner, Jr. et al., *Stressed Mirror Polishing. 1: A Technique for Producing Non-Axisymmetric Mirrors*, Applied Optics, vol. 19, No. 14 (1980) 2332-2340.

Lubliner, J. et al., *Stressed Mirror Polishing. 1: A Technique for Producing Nonaxisymmetric Mirrors*, Applied Optics, vol. 19, No. 14 (1980) pp. 2332-2340.

Nelson, J.E. et al., *Stressed Mirror Polishing. 2: Fabrication of an Off-Axis Section of a Paraboloid*, Applied Optics, vol. 19, No. 14 (1980) pp. 2341-2352.

\* cited by examiner

METHOD OF SHAPING AN OPTICAL
ELEMENT THAT IS ELASTICALLY
DEFORMED BY AN ADHESIVELY-BONDED
RING

FIELD

The invention relates to a method of shaping an aspherical optical element, such as a lens or mirror.

BACKGROUND

Shaping optical elements that are not only aspherical but that are also of large dimensions is a process that is lengthy, difficult, and expensive because of the requirements in terms of accuracy and surface smoothness. A particularly advantageous method of proceeding is a method of polishing under stress that is known as "stressed mirror polishing (SMP)". It is described in detail in the following articles:

"Stressed mirror polishing. 1: A technique for producing non-axisymmetric mirrors", Jacob Lubliner and Jerry E. Nelson, Applied Optics, Vol. 19, Issue 14, pp. 2332-2340 (1980); and "Stressed mirror polishing. 2: Fabrication of an off-axis section of a paraboloid", Jacob Lubliner and Jerry E. Nelson, Applied Optics, Vol. 19, Issue 14, pp. 2341-2352 (1980).

The general principle consists in machining a spherical structure on a stressed blank so as to obtain a surface that is aspherical once the stress is released. The intended purpose is to obtain an optical surface that is aspherical while performing the shaping on a surface that is spherical, because the tools used for shaping a spherical surface provide very high performance, in particular when shaping surfaces of items of large dimensions. Thus, a feature of polishing under stress is how to implement the stress.

In order to implement the method, an appropriate blank is generally in the form of a plate, i.e. with one of its dimensions that is significantly smaller (by one or more orders of magnitude) than its other two dimensions. Typically, the blank may have thickness of the order of 10 millimeters (mm) to 100 mm, e.g. 50 mm, and a diameter of the order of 1000 mm to 2000 mm, or even more. Thus, the plate has two faces, which are referred to as main surfaces, and a side surface.

One of the two main surfaces is the "optical" surface that needs to be shaped. Preferably, its original shape is spherical or planar. The term "blank" is used herein to mean the optical element in its state prior to being shaped under stress.

The other main surface of the blank is the rear surface behind the optical surface.

In the conventional SMP technique, radially-oriented arms are fastened to the side surface of the blank, e.g. by adhesive. In the above-mentioned articles by J. Lubliner et al., it is shown that deformation appropriate for the intended purpose can be obtained by subjecting said arms only to shear force that are oriented parallel to the surface.

As explained above, the forces applied to the blank are selected so as to give the optical surface a spherical shape complementary to the desired shape. The deformation (departure from a spherical shape) may reach values of several hundreds of micrometers; and it may be monitored accurately by performing interferometric measurements on the optical face itself or on the rear face of the blank.

Thereafter, a method of shaping by abrasion is performed in order to make the deformed surface planar or spherical. Finally, releasing the stresses allows the blank to relax, and the shaped surface takes on the desired aspherical shape.

That method suffers from imperfections. The forces and the moments are applied by means of arms, thereby giving rise to stresses at the periphery of the blank that are not uniform. On its outer perimeter, stress fluctuates between local maxima at the root end of each arm and local minima between arms. After shaping, this gives rise to serrations, i.e. undesirable geometrical modulation of the optical surface at the periodicity of the arms.

The method described in patent EP 2 144 093 remedies that unwanted effect by fastening a blank of an optical element having an optical surface that is to be shaped to a ring. FIGS. 1 and 2 show such fastening of the optical element 1 to the ring 2. FIG. 1 shows in particular a ring 2 of diameter dl that surrounds an optical element 1 and that is itself surrounded by a multitude of arms 4. It is these arms that apply the stress to the ring, which in turn stresses and deforms the optical element 1. The forces are thus applied by the arms to the perimeter 23 of the ring 2 in order to deform it in controlled manner, and also deform in controlled manner the optical element 1 that is fastened thereto, and thus deform its optical surface 10. That ring distributes the stresses uniformly within the optical part and makes it possible to avoid generating defects of high spatial frequency. Finally, the last step of the method consists in extracting the blank 1 from the ring 2 so as to release the stresses deforming said optical surface that has been shaped by abrasion in order to enable the surface to acquire the desired aspherical shape.

FIG. 2 shows more precisely the prior art method of fastening the optical element 1 to the ring 2. It consists in:

inserting the optical element 1 inside the ring 2: the outside surface 12 of the optical element faces the inside surface 33 of the ring; and using a layer of adhesive 3 for fastening the optical element to the ring before applying stresses.

That method presents the following drawbacks:

requiring a strict match between the size of the ring and the size of the blank;

making use of high levels of stress in the layer of adhesive; and occupying a large amount of space around the completed assembly as a result of the presence of the arms.

SUMMARY

The invention described in the present patent application seeks to improve the fabrication method of above-specified patent application EP 2 144 093 that is described briefly above. More particularly, one of the objects of the invention is to be able to use the same ring with blanks of different diameters;

another object of the invention is to reduce the overall size of the assembly made up of the ring and the arms that apply the stress for obtaining the deformation;

another object of the invention is to relax fabrication tolerances relating to the match between the shapes of the ring and of the blank;

another object of the invention is to minimize the stresses to which the adhesive is subjected;

another object of the invention is to be able to adjust easily the amplitude of the stresses to which the adhesive is subjected:

another object of the invention is to increase the range of adhesives that may potentiality be selected;

another object of the invention is to relax the geometrical constraints between the size of the blank, the size of the ring, and the size of the layer of adhesive; and another object of the invention is to reduce or eliminate the sensitivity of the assembly to temperature variations.

In accordance with the invention, at least one of the above-mentioned objects may be achieved by a method of shaping an aspherical optical element, the method comprising the steps consisting in:

fastening an optical element blank to a ring, the optical element blank presenting two main surfaces that comprise:
i. an optical surface that is to be shaped and that is a "front" surface; and
ii. an opposite surface referred to as a "rear" surface;
applying forces and moments to the ring in order to deform it in controlled manner, and also deform in controlled manner the blank and its optical surface, which blank is fastened to the ring;
using abrasion to shape said deformed optical surface, as to restore it to a shape that is spherical or planar; and
extracting the blank from the ring so as to release the stresses deforming said optical surface that has been shaped by abrasion so as to enable said surface to acquire the desired aspherical shape;
the method being characterized in that the step of fastening the blank to the ring is performed by bonding one of said main surfaces of the blank on a surface of the ring that is parallel thereto and that faces it, by means of a layer of adhesive.

In general manner, the term "ring" is used to designate a single-piece element serving to connect together the points that are fastened to the blank while presenting an opening that gives access to the rear face of the blank.

In advantageous implementations of the invention:
the fastening step may comprise applying adhesive to a blank for which the perimeter(s) of the main surface is/are different from the inside perimeter of the ring, i.e. the ring and the blank need not be an exact match in order to be capable of being fastened to each other;
the forces and the moments applied to the ring may be applied by arms that are fastened to a surface of the ring that is perpendicular to the layer of adhesive, i.e. an inside surface or an outside surface of the ring;
the forces and the moments that are applied to the ring are applied by arms that are fastened to a surface of the ring that is parallel to the layer of adhesive, i.e. a surface opposite to the adhesively-bonded surface;
the blank may be fastened to a ring that possesses a shoulder that is on the inside of the ring and that is fastened to the blank;
the ring may possess a protuberance for recentering the neutral axis of the section of the ring;
it is possible for only the periphery of one of the main surfaces of the blank to be adhesively bonded to the ring;
the blank may be fastened to the ring so as to make their axes of circular symmetry coincide; and
the ring may be made of the same material as the optical element.

BRIEF DESCRIPTION OF THE DRAWINGS

Other characteristics, details, and advantages of the invention appear on reading the following description made with reference to the accompanying drawings given by way of example and in which.

DETAILED DESCRIPTION

The method of the invention makes it possible to fabricate an aspherical optical element such as a mirror or a lens out of a blank made of an appropriate material, typically a glass or a ceramic.

Figure 1:
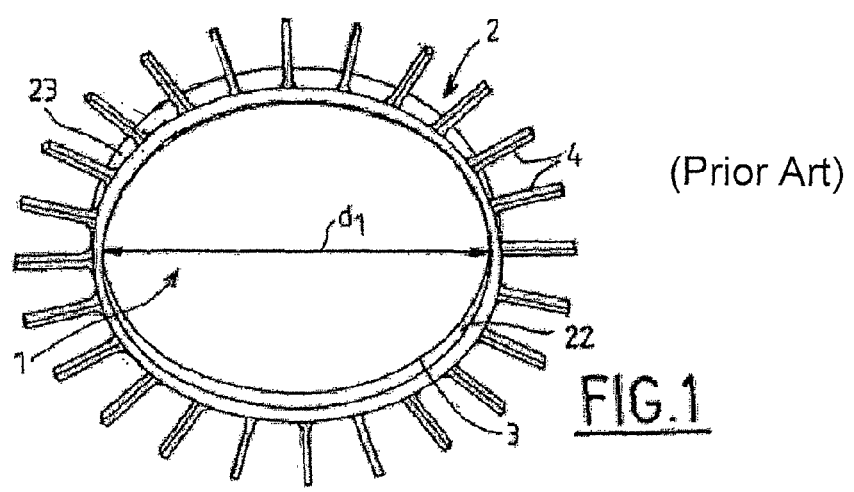
FIG. 1 is a perspective view of the ring and of the arms in the prior art.
Figure 2:
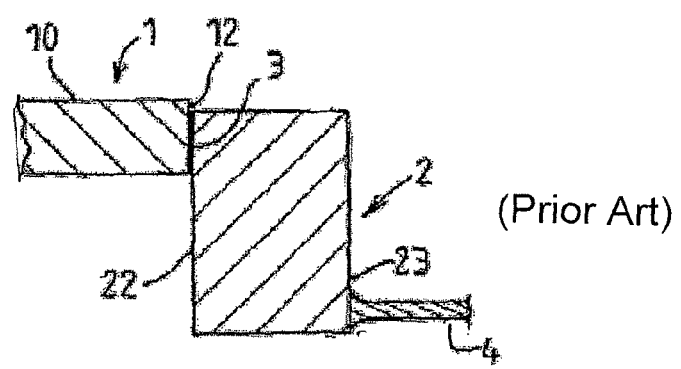
FIG. 2 is a section view of the ring and of the arm in the prior art.
Figure 3:
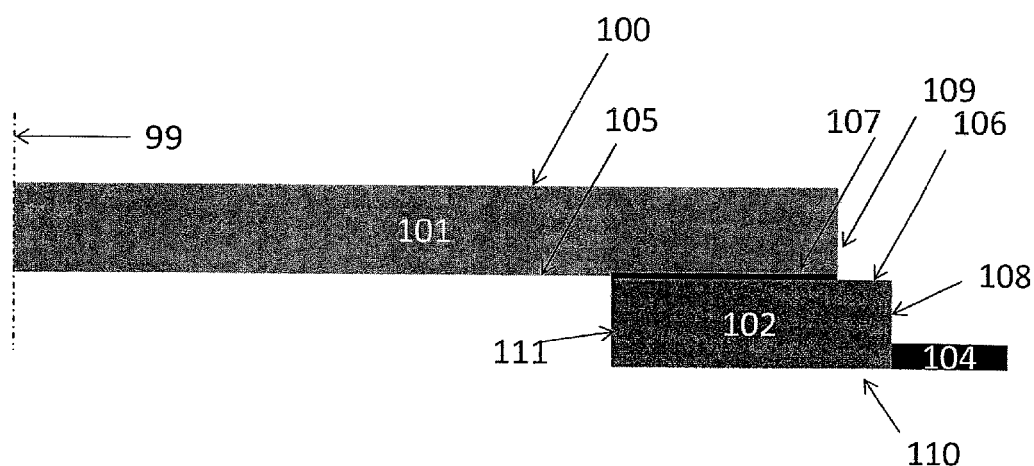
FIG. 3 is a section view of the rear surface of the blank adhesively bonded on the ring in accordance with the invention.

A method of fastening the blank 101 on the ring 102 is shown in FIG. 3.

The blank 101 of the optical element is in the form of a plate and it possesses two main surfaces that are large compared with the side surface of the plate. One of these main surfaces is the optical surface 100 that is to be shaped. The other main surface is the surface at the rear of the plate. It is referred to below as the "rear surface" 105.

The ring 102 is of a shape that is substantially close to the shape of the blank: it surrounds the blank. Thus, it presents a plate aspect ratio comparable to that of the ring.

The arms 104 are fastened to the outside surface 108 of the ring. They could also be fastened to the inside surface 111 of the ring.

Still in the preferred implementation of the invention, the rear face 105 of the blank is fastened on a surface 106 of the ring that faces it. An example is shown in FIG. 3. The dashed line 99 represents the optical axis of the blank. It may coincide with an axis of circular symmetry of the ring and of the blank. This implementation is referred to as "on top" fastening because the optical surface is typically the top face of the optical element and is thus itself above the ring. Fastening is performed with a layer of adhesive 107.

In comparison with a method of fastening the blank to the inside 111 of the ring, i.e. fastening the side surface 109 of the blank to the ring, an immediate advantage of this method of fastening is to relax constraints concerning fabrication tolerances for the blank, for the ring, and for the layer of adhesive. In the prior art as disclosed in the above-mentioned patent, the inside surface of the ring is dimensioned to be an exact match with the outside surface of the blank and the layer of adhesive. Given the large size of those items, that type of fabrication tolerance is very expensive. The invention described in the present specification eliminates that requirement.

Thus, the thickness of the layer of adhesive is selected solely as a function of the mechanical stress it is to withstand, and possibly with the help of recommendations from the manufacturer.

Furthermore, the amplitude of the stresses in the layer of adhesive is easily adjusted by selecting the width of that layer.

This simple adjustment of stresses within the adhesive increases the accuracy with which the shaping method is performed.

Consequently, reducing mechanical stresses in the layer of adhesive makes it possible to use a wider range of types of adhesive, since the level of mechanical strength required is smaller.

Another advantage is that the same ring can be used for blanks of several sizes.

Another advantage is that fastening the blank on the ring makes it possible to obtain a field of stresses in the layer of adhesive that is more uniform.

Figure 4:
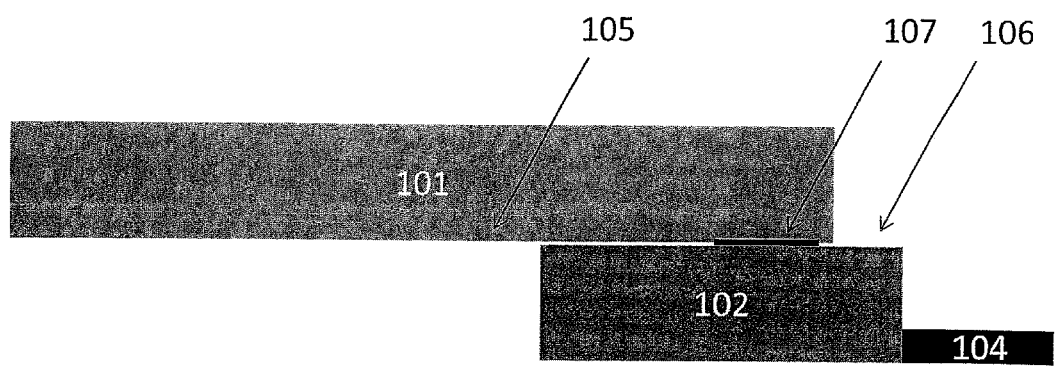
FIG. 4 is a section view of the blank adhesively bonded on the ring using a different adjustment for the width of layer of adhesive.
Figure 5:
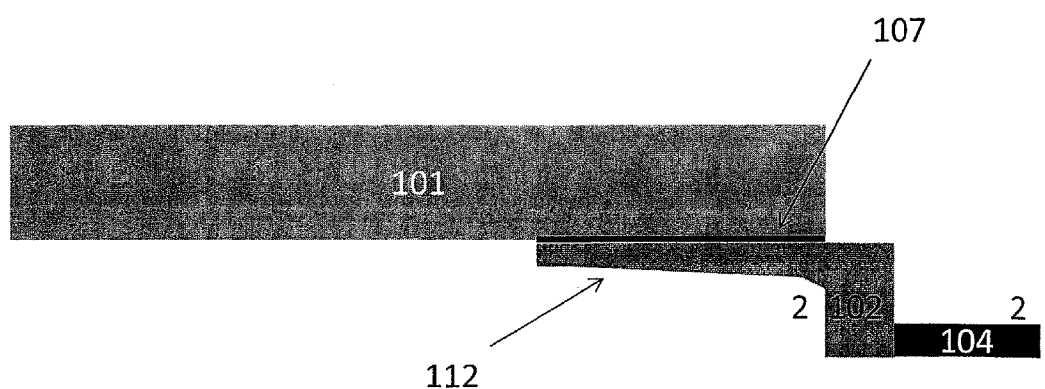
FIG. 5 is a section view of the blank adhesively bonded on the ring, showing a shoulder in accordance with an alternative implementation of the invention.

An alternative implementation is shown in FIG. 5. In comparison with that shown in FIG. 4, the ring is lightened by omitting material, and it thus presents a shoulder 112 that is on the inside of the ring and onto which the blank 101 is fastened. Such a configuration minimizes the stresses in the adhesive joint.

In a preferred implementation of the invention, the materials of the ring and of the blank are identical in order to avoid unwanted deformations and stresses in the adhesive that might be induced by temperature variations.

Figure 6:
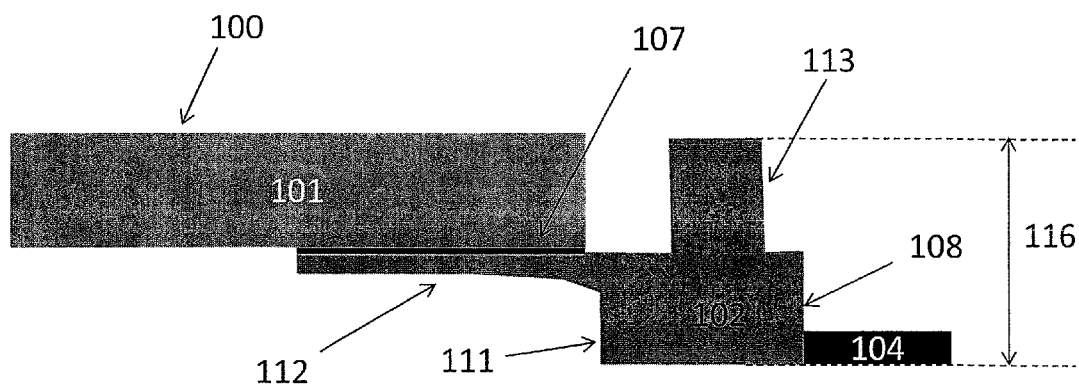
FIG. 6 is a section view of the blank adhesively bonded on the ring, showing a protuberance that can serve to recenter the neutral axis of the section of the ring, in accordance with another alternative implementation of the invention.

Another implementation is shown in FIG. 6. The ring is provided with a protuberance 113 on its periphery that tends to recenter the position of the neutral axis of the ring towards that of the optical blank, thereby reducing adhesive stresses and limiting thermal deformation of the face 100 if the expansion coefficients of the materials of the blank 101 and of the ring 102 are different. In addition, the protuberance 113:

- makes it possible for the adhesively-bonded assembly (blank plus ring) to conserve a center of inertia that is situated inside the blank and close to its optical face, which in turn makes it possible to perform shaping by abrasion with said optical face facing upwards or downwards and improves the effectiveness of such shaping by reducing any torque due to friction forces against the optical face during shaping; and
- helps in positioning the blank relative to the ring by providing lateral guidance.

This protuberance is characterized in that it tends to increase the thickness 116 of the section of the ring close to its outside surface 108 (outside relative to its inside surface 111), i.e. its periphery.

Figure 7:
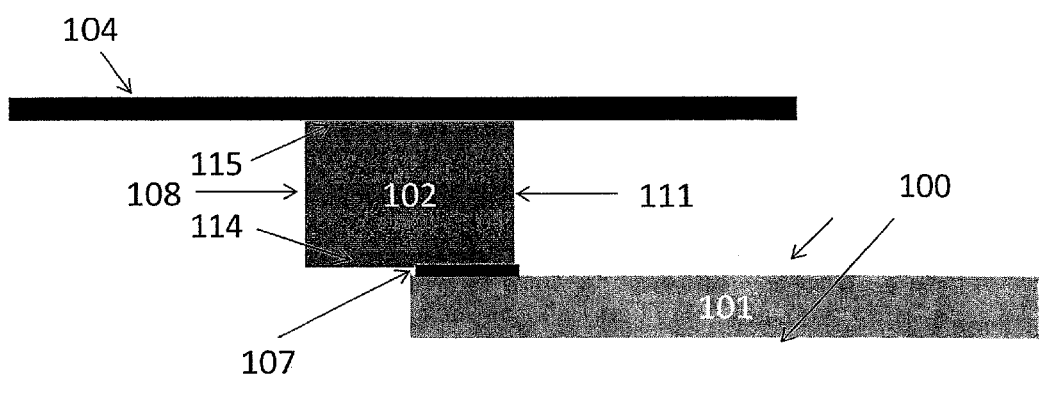
FIG. 7 is a section view of the blank adhesively bonded on the ring, showing arms that are fastened to the surface of the ring that is remote from the layer of adhesive and that extend towards the inside and towards the outside of the ring in accordance with another alternative implementation of the invention.

Another implementation is shown in FIG. 7. The arms 104 are connected to the ring no longer via its bottom cylindrical surface 111 or outer cylindrical surface 108, but via the plane face 115 that is remote from the face 114 that is adhesively bonded with the layer of adhesive 107, with the arms extending symmetrically both towards the outside and towards the inside of the ring. This configuration reduces the overall outside size of the assembly without masking the rear face of the blank, as would happen if the arms extended solely towards the inside.

In any event, it is also possible to apply (uniform or non-uniform) pressure against the rear surface of the blank, with reaction against the ring in order to induce additional deformation, making it possible in particular to correct spherical aberration.

The invention claimed is:

1. A method of shaping an aspherical optical element, the method comprising the following steps:
    fastening an optical element blank to a ring to which arms are fastened, the optical element blank presenting two main surfaces which are:
        an optical surface that is to be shaped and that is a front surface; and
        an opposite surface referred to as a rear surface;
    applying forces and moments to the ring by said arms in order to deform said ring in controlled manner, and also deform in controlled manner the blank and its optical surface, which blank is fastened to the ring;
    using abrasion to shape said deformed optical surface, as to restore it to a shape that is spherical or planar; and
    extracting the blank from the ring so as to release the stresses deforming said optical surface that has been shaped by abrasion so as to enable said surface to acquire the desired aspherical shape;
    wherein the method includes the step of fastening the blank to the ring is performed by bonding one of said main surfaces of the blank on a surface of the ring that is parallel thereto and that faces it, by means of a layer of adhesive.

2. A method according to claim 1, wherein the fastening step comprises applying adhesive to the blank for which the perimeter(s) of the main surface is/are different from the inside perimeter of the ring.

3. A method according to claim 1, wherein said arms are fastened to a plurality of surfaces of the ring that are perpendicular to the layer of adhesive.

4. A method according to claim 1, wherein said arms are fastened to a surface of the ring that is parallel to the layer of adhesive.

5. A method according to claim 1, wherein the blank is fastened to a ring that possesses a shoulder that is on the inside of the ring and that is fastened to the blank.

6. A method according to claim 1, wherein the ring possesses a protuberance on its periphery in order to recenter the neutral axis of the section of the ring onto the neutral axis of the blank.

7. A method according to claim 1, wherein only the periphery of one of the main surfaces of the blank is adhesively bonded to the ring.

8. A method according to claim 1, wherein the blank is fastened to the ring so as to make their axes of circular symmetry coincide.

9. A method according to claim 1, wherein the ring is made of the same material as the blank.

* * * * *